(12) United States Patent
Meer et al.

(10) Patent No.: US 9,411,456 B2
(45) Date of Patent: Aug. 9, 2016

(54) EMBEDDED LIGHT-SENSING COMPONENT (71) Applicant: Google Technology Holdings LLC, Mountain View, CA (US)

(72) Inventors: Daniel J. Meer, Chicago, IL (US); Thomas E. Gitzinger, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 20 days.

(21) Appl. No.: 14/476,410

(22) Filed: Sep. 3, 2014

(65) Prior Publication Data
US 2015/0378487 A1 Dec. 31, 2015

Related U.S. Application Data (60) Provisional application No. 62/017,059, filed on Jun. 25, 2014.

(51) Int. Cl.
*G09G 5/00* (2006.01)
*G06F 3/041* (2006.01)
*G06F 3/01* (2006.01)
*G09G 3/20* (2006.01)

(52) U.S. Cl.
CPC .............. *G06F 3/0412* (2013.01); *G06F 3/014* (2013.01); *G09G 3/20* (2013.01); *G06F 2203/04103* (2013.01); *G06F 2203/04106* (2013.01); *G09G 2320/0626* (2013.01); *G09G 2330/023* (2013.01); *G09G 2360/141* (2013.01); *G09G 2360/144* (2013.01)

(58) Field of Classification Search
CPC ....... G06F 3/013; G06F 3/0482; G06F 3/044; G02B 2027/0185; G02B 2027/0134; G02B 2027/0178; G05D 23/1902; G05D 23/1917; G05D 23/1919; F24F 11/0009; F24F 11/0012
USPC .......... 345/156, 204–214, 6, 419, 8; 324/658; 359/627; 73/865.6; 351/159.03
See application file for complete search history.

(56) References Cited

U.S. PATENT DOCUMENTS

| | | | | |
|---|---|---|---|---|
| 4,755,053 A | * | 7/1988 | Levinson | G03F 9/7076 356/399 |
| 8,259,088 B1 | * | 9/2012 | D'Souza | G06F 3/0423 178/18.09 |
| 8,731,618 B2 | * | 5/2014 | Jarvis | F16F 1/027 267/164 |
| 8,786,548 B2 | * | 7/2014 | Oh | H04M 1/22 345/158 |
| 8,896,553 B1 | * | 11/2014 | Xu | G06F 3/0317 345/173 |
| 8,898,496 B1 | * | 11/2014 | Chi | G06F 1/3206 455/574 |
| 9,092,684 B1 | * | 7/2015 | Sundaram | G06K 7/10891 |
| 2005/0037843 A1 | * | 2/2005 | Wells | G07F 17/3211 463/30 |
| 2005/0237317 A1 | * | 10/2005 | Cok | G06F 3/0421 345/207 |
| 2007/0091272 A1 | * | 4/2007 | Lerner | H04N 9/3105 353/31 |

(Continued)

*Primary Examiner* — Prabodh M Dharia
(74) *Attorney, Agent, or Firm* — Faegre Baker Daniels LLP (57) ABSTRACT

In embodiments of an embedded light sensing component, a lens assembly includes a display component to display a user interface, such as when implemented in a wearable device. The lens assembly has a lens structure that covers the display component. The lens assembly also includes a light sensor that is implemented to sense ambient light in an environment proximate the lens structure, where the light sensor is embedded between the display component and the lens structure of the lens assembly.

18 Claims, 7 Drawing Sheets

(56) References Cited

U.S. PATENT DOCUMENTS

| | | | | |
|---|---|---|---|---|
| 2008/0189173 A1* | 8/2008 | Bakar | G06Q 30/02 | 705/14.14 |
| 2009/0018419 A1* | 1/2009 | Torch | A61B 3/0066 | 600/318 |
| 2010/0156676 A1* | 6/2010 | Mooring | G06F 3/017 | 341/20 |
| 2012/0236540 A1* | 9/2012 | Gilbert | G02F 1/133526 | 362/97.1 |
| 2012/0313839 A1* | 12/2012 | Smithwick | G02B 27/2214 | 345/6 |
| 2013/0043697 A1* | 2/2013 | Holmes | B02C 2/04 | 294/86.4 |
| 2013/0141118 A1* | 6/2013 | Guard | G06F 3/044 | 324/658 |
| 2013/0248691 A1* | 9/2013 | Mirov | G01J 1/32 | 250/214 AL |
| 2014/0177521 A1* | 6/2014 | Agarwal | H04B 7/18515 | 370/316 |
| 2014/0327875 A1* | 11/2014 | Blum | A61F 2/1618 | 351/159.03 |
| 2014/0337621 A1* | 11/2014 | Nakhimov | G06F 1/163 | 713/168 |
| 2015/0027242 A1* | 1/2015 | Suga | G01N 17/004 | 73/865.6 |
| 2015/0146297 A1* | 5/2015 | Commander | G02B 3/0006 | 359/627 |
| 2015/0177521 A1* | 6/2015 | Abdollahi | G02B 27/017 | 345/8 |
| 2015/0187115 A1* | 7/2015 | MacDonald | G06F 3/013 | 345/419 |
| 2015/0355475 A1* | 12/2015 | Meer | G02B 27/62 | 359/894 |

* cited by examiner

EMBEDDED LIGHT-SENSING COMPONENT

RELATED APPLICATION

This application is a continuation of and claims priority to U.S. Patent Application Ser. No. 62/017,059 filed Jun. 25, 2014 entitled "Embedded Light Sensing Component", the disclosure of which is incorporated by reference herein in its entirety.

BACKGROUND

Wearable devices, such as watches that are essentially a small computing device, are becoming more popular with users. Generally, a wearable watch device can be used in the traditional sense to track time, and now may be used for communication with a user's mobile phone, such as to display received messages, incoming phone calls, calendar appointments, and generally as an extended interface of the mobile phone. However, these wearable types of devices may not be aesthetically appealing to wear and/or can be bulky and overly cumbersome. As such, manufacturers of these wearable devices may not incorporate various functions and features that would add to the bulk or degrade the aesthetics of a device, such as functions and features that may typically be integrated into a mobile phone or other similar consumer electronic and computing devices.

BRIEF DESCRIPTION OF THE DRAWINGS

Embodiments for an embedded light sensing component are described with reference to the following Figures. The same numbers may be used throughout to reference like features and components that are shown in the Figures.

DETAILED DESCRIPTION

Embodiments of an embedded light sensing component are described, such as for wearable device that includes an ambient light sensor positioned to sense ambient light that is detectable on a display screen of a display component of the wearable device. As a small computing device, the wearable device can be used in the traditional sense to display the time, and may also be used for communication with a user's mobile phone, such as to display received messages, incoming phone calls, calendar appointments, and generally as an extended interface of the mobile phone. The techniques described herein for an embedded light sensing component maintain an aesthetic appeal of the wearable device by reducing the thickness of the device while still incorporating an ambient light sensor. Further, the ambient light sensor is positioned in the wearable device so as to accurately detect the ambient light that is present on a display screen of the device, rather than simply detecting the ambient light that may be present around or to the side of a device, depending on the positioning of a light sensor.

In implementations, the wearable device includes the light sensor positioned in a laminate stack between a display component and a lens structure of the device. The display component includes the display screen that displays a user interface, such as to display the current time and date, as well as received messages, incoming phone calls, calendar appointments, and any other displayable information when the wearable device is paired with a user's mobile phone, for example. The lens structure of the wearable device covers the display component and can be implemented as a two-part poly carbonate lens structure configured with cutouts through which the light sensor is embedded. For example, the two-part lens structure can include a first poly carbonate lens that is designed for printed graphics, which are protected between the first poly carbonate lens and a second poly carbonate lens of the lens structure.

The display component of the wearable device may also be implemented as a touchscreen, in which case the device includes a touch sensor that is layered between the display component and the lens structure. Similar to the lens structure, the touch sensor is also configured with a cutout through which the light sensor is said embedded. As noted above, the position of the ambient light sensor on a face of the display component provides that the light sensor can accurately detect the ambient light that is present on the display screen of the device. Further, the ambient light sensor is embedded in the cutouts of the touch sensor and the lens structure that are positioned over the display component so as not to increase the thickness of the wearable device. Additionally, because the light sensor is positioned to accurately detect the ambient light that is present on the display screen of the device in a given environment, the display component can include an adjustable display brightness based on the ambient light that is sensed by the light sensor, which is effective to conserve display component power.

While features and concepts of an embedded light sensing component can be implemented in any number of different devices, systems, environments, and/or configurations, techniques of an embedded light sensing component are described in the context of the following example devices, systems, and methods.

Figure 1:
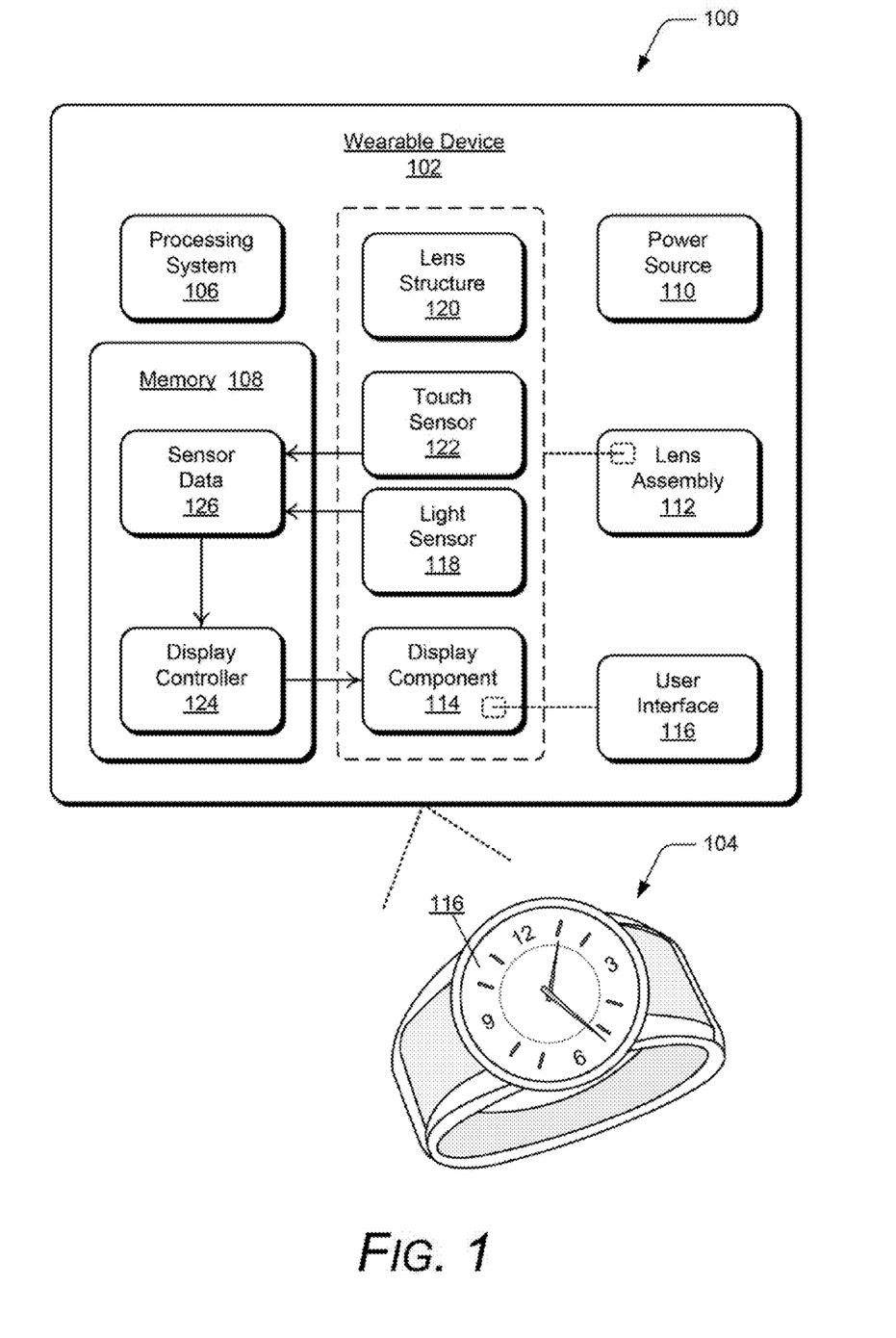
FIG. 1 illustrates an example wearable device in which techniques of an embedded light sensing component can be implemented.

FIG. 1 illustrates an example 100 of a wearable device 102 in which techniques of an embedded light sensing component can be implemented. In this example, the wearable device 102 may be any type of portable electronic and/or computing device, such as a watch device 104 that is itself implemented as a small computing device, or "smart device". The wearable device 102 can be implemented with various components, such as a processing system 106 and memory 108, as well as any number and combination of differing components as further described with reference to the example device shown in FIG. 7. For example, the wearable device 102 can include a power source 110 to power the device, such as a flexible strip battery, a rechargeable battery, and/or any other type of active or passive power source that may be implemented in a wearable device.

The example wearable device 102 includes a lens assembly 112, which incorporates multiple components described with reference to FIG. 1, as well as in more detail with reference to FIGS. 2-4. The lens assembly 112 includes a display component 114 of the wearable device. The display component includes a display screen to display a user interface 116 of the wearable device, such as to display the current time and date when the wearable device is used in the traditional sense as a watch (e.g., shown at 104). The user interface 116 can also be implemented to display received messages, incoming phone calls, calendar appointments, and any other displayable information when the wearable device 102 is paired with a user's mobile phone, for example.

The lens assembly 112 of the wearable device 102 includes a light sensing component, such as a light sensor 118 (also referred to as an ambient light sensor). The light sensor is positioned to sense the ambient light that is detectable on the display screen of the display component 114 of the wearable device. The light sensor 118 is positioned in a laminate stack between the display component 114 and a lens structure 120 of the device. The lens assembly 112 also includes a touch sensor 122 that is layered between the display component and the lens structure. The lens structure 120 is positioned to cover the touch sensor 122 and the display component 114, and both the lens structure and the touch sensor are configured with cutouts through which the light sensor 118 is embedded. The cutouts in the lens structure and the touch sensor are shown in more detail in FIG. 2. The light sensor is embedded in the cutouts of both the touch sensor 122 and the lens structure 120 that are positioned over the display component 114. Accordingly, the light sensor can be positioned in the wearable device to detect the ambient light that is present on the display screen of the display component 114 without having to increase the thickness of the wearable device 102 to accommodate the light sensor.

In implementations, the lens structure 120 of the lens assembly 112 can be implemented as a two-part poly carbonate lens structure that is configured with the cutouts through which the light sensor 118 is embedded. For example, the two-part lens structure can include a first poly carbonate lens that is designed for printed graphics, which are protected between the first poly carbonate lens and a second poly carbonate lens of the lens structure. The printed graphics are surface decoration or artwork that can be designed to mask or cover the ambient light sensor, as well as cover other lens assembly components. The printed graphics can be incorporated on the top surface of the second poly carbonate lens, or can be incorporated on the back surface of the first poly carbonate lens, and the printed graphics are protected from damage between the two lenses.

The example wearable device 102 can include a display controller 124 that can be implemented as a software application or module, such as executable software instructions (e.g., computer-executable instructions) that are executable with the processing system 106 of the wearable device. The display controller 124 can be stored on computer-readable storage memory, such as any suitable memory 108 or electronic data storage implemented by the wearable device. The display controller 124 is implemented to receive sensor data 126 that is generated by the light sensor 118 and/or by the touch sensor 122. The display controller can then process the sensor data 126 and control or update the display component 114 accordingly. For example, the display controller 124 can adjust the display brightness of the display component based on the ambient light that is sensed by the light sensor in the environment proximate the lens structure 120, which can be utilized to conserve display component power usage.

Figure 2:
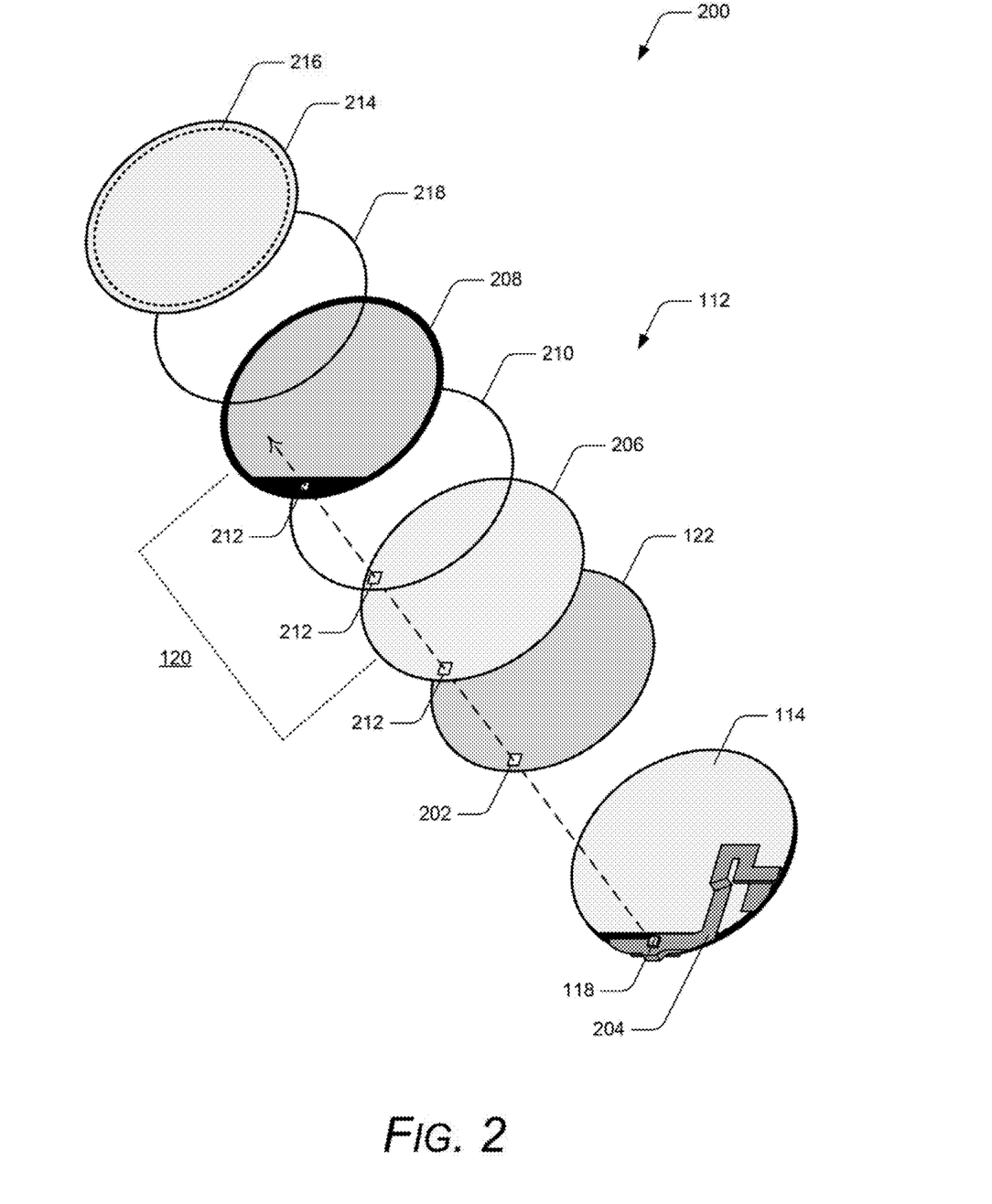
FIG. 2 illustrates an example of a lens assembly in which techniques of an embedded light sensing component can be implemented.

FIG. 2 illustrates an example 200 of the lens assembly 112 of the wearable device 102 in which techniques of an embedded light sensing component can be implemented. In this example, the lens assembly 112 includes the display component 114, the light sensor 118, and the touch sensor 122 as described with reference to FIG. 1. The touch sensor 122 has a cutout 202 that aligns with the light sensor 118, and through which the light sensor 118 is embedded in the assembled lens assembly. In implementations, the touch sensor 122 is designed with X and Y bonding pads configured in four split sections, where two of the split sections are layered above the light sensor 118 in the lens assembly as first X and Y bonding pads, and another two of the split sections are layered below the light sensor in the lens assembly as second X and Y bonding pads. The lens assembly 112 includes a touch sensor flex connector 204, and the light sensor 118 is positioned in the middle of the flex connector with a step in the Z-direction to accommodate the light sensor. The touch sensor flex connector has three height levels and the X and Y bonding pads are split into the four sections so that the flex connector can step down in the center to fit the maximum height of the ambient light sensor without interference.

The lens assembly 112 also includes the lens structure 120 that can be implemented as a two-part poly carbonate lens structure, having a first poly carbonate lens 206 and a second poly carbonate lens 208 bound together with an optically clear adhesive 210. The poly carbonate lenses 206 and 208, as well as the optically clear adhesive 210, have cutouts 212 that align with the light sensor 118, and through which the light sensor 118 is embedded in the lens structure. The overall lens assembly 112 also includes a glass lens 214 and, optionally, a lens protective liner 216 over the glass lens. The glass lens 214 and the second poly carbonate lens 208 can also be bound together with an optically clear adhesive 218.

Figure 3:
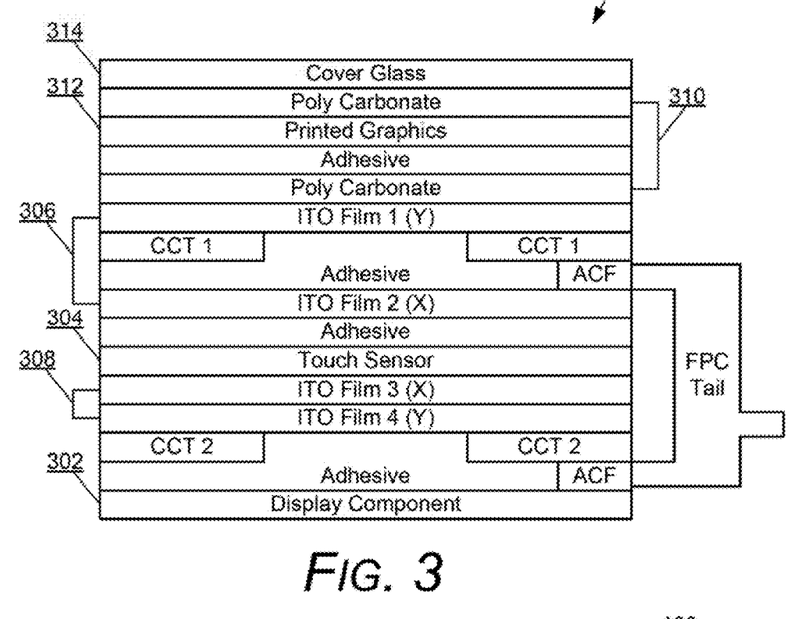
FIG. 3 illustrates an example lens assembly stack in implementations of an embedded light sensing component in accordance with one or more of the techniques.

FIG. 3 illustrates an example of a lens assembly stack 300 in techniques of an embedded light sensing component, and the lens assembly stack can be implemented as the lens assembly 112 in a wearable device, such as the watch device 104 described with reference to FIG. 1. Many of the components and features of the lens assembly stack are described with reference to the lens assembly 112 shown in FIGS. 1 and 2. The lens assembly stack 300 includes a display component 302 and a touch sensor 304. The lens assembly stack 300 also includes the X and Y bonding pads (identified as the ITO film), where two of the bonding pads 306 are layered above the touch sensor 304 and another two of the bonding pads 308 are layered below the touch sensor 304 in the lens assembly stack.

The lens assembly stack 300 also has a two-part poly carbonate lens structure 310 having a first poly carbonate lens and a second poly carbonate lens, as well as printed graphics 312 that are protected between the two poly carbonate lenses. The lens assembly stack 300 is topped with a cover glass 314 that is positioned over the second poly carbonate lens of the lens structure 310.

Figure 4:
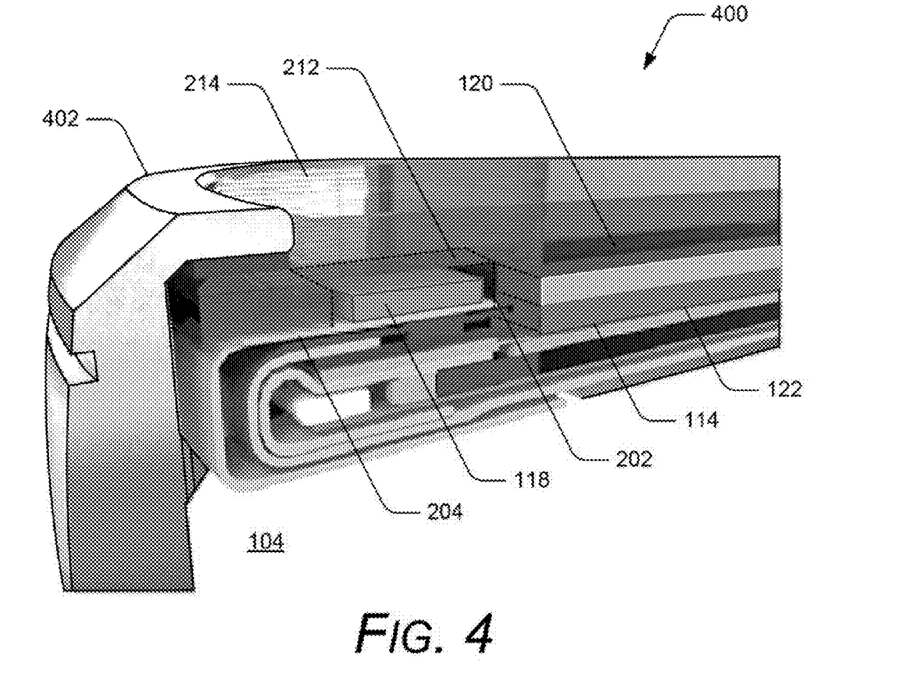
FIG. 4 illustrates a cut view of an example wearable device showing an implementation of an embedded light sensing component in accordance with one or more of the techniques.

FIG. 4 illustrates a cut view 400 of an example wearable device, such as the watch device 104 described with reference to FIG. 1 that implements an embedded light sensing component. The watch device 104 has a device housing 402 that incorporates the components and features of a wearable device, such as described with reference to the wearable devices and lens assemblies described in FIGS. 1-3. The cut view 400 illustrates the display component 114, the touch sensor 122, and the lens structure 120 in the device housing

402. The light sensor 118 is positioned on the touch sensor flex connector 204 and is embedded in the touch sensor cutout 202 and the lens structure cutouts 212. The glass lens 214 is positioned over the components and held in place by the device housing 402.

Example method 500 is described with reference to FIG. 5 in accordance with implementations of an embedded light sensing component. Generally, any one or more of the services, components, modules, methods, and operations described herein can be implemented using software, firmware, hardware (e.g., fixed logic circuitry), manual processing, or any combination thereof. The example methods may be described in the general context of executable instructions stored on computer-readable storage memory that is local and/or remote to a computer processing system, and implementations can include software applications, programs, functions, and the like.

Figure 5:
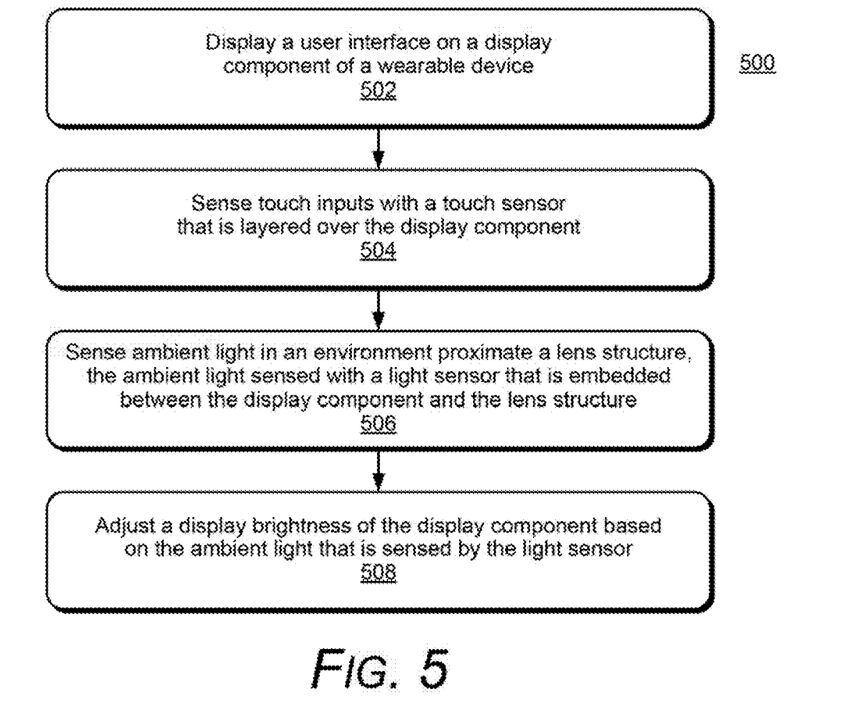
FIG. 5 illustrates an example method for an embedded light sensing component in accordance with one or more of the techniques.

FIG. 5 illustrates example method(s) 500 of an embedded light sensing component. The order in which the method is described is not intended to be construed as a limitation, and any number or combination of the described method operations can be performed in any order to perform a method, or an alternate method.

At 502, a user interface is displayed on a display component of a wearable device. For example, the display component 114 in the lens assembly 112 of the wearable device 102 (FIG. 1) includes a display screen that displays a user interface 116 of the wearable device, such as to display the current time and date when the wearable device is used in the traditional sense as a watch (e.g., shown at 104). The user interface 116 can also be implemented to display received messages, incoming phone calls, calendar appointments, and any other displayable information when the wearable device 102 is paired with a user's mobile phone, for example.

At 504, touch inputs are sensed with a touch sensor that is layered over the display component. For example, the touch sensor 122 is layered over the display component 114, and the touch sensor 122 senses touch inputs on the display of the wearable device 102.

At 506, ambient light is sensed in an environment proximate a lens structure, where the ambient light is sensed with a light sensor that is embedded between the display component and the lens structure. For example, the light sensor 118 is a light sensing component that senses the ambient light in an environment proximate the lens structure 120 that covers the touch sensor 122 and the display component 114. The ambient light sensor 118 is embedded between the display component 114 and the lens structure 120, and is positioned to accurately sense the ambient light that is detectable on the display screen of the display component.

At 508, a display brightness of the display component is adjusted based on the ambient light that is sensed by the light sensor. For example, display controller 124 that is implemented by the wearable device 102 adjusts the display brightness of the display component 114 based on the ambient light that is sensed by the light sensor 118 in the environment proximate the lens structure 120, and the adjustable display brightness is effective to conserve display component power.

Figure 6:
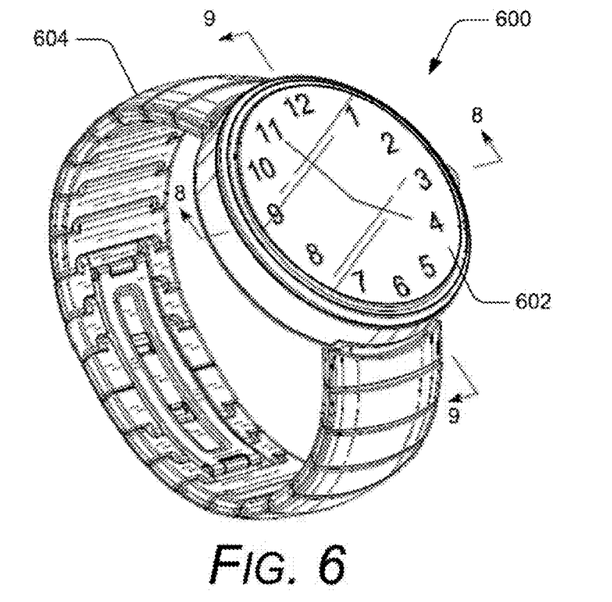
FIG. 6 illustrates an overview of a representative wearable device implemented as a smartwatch in accordance with the techniques for an embedded light sensing component.

FIG. 6 illustrates an overview of a representative wearable device implemented as a smartwatch 600 in accordance with the described techniques for an embedded light sensing component. The smartwatch 600 is an example of the wearable device 102 described with reference to FIG. 1. The smartwatch 600 includes a display 602 and a wristband 604. While the disclosure description uses the form factor of the smartwatch 600 or the watch device 104 to illustrate the present techniques, it should be appreciated that the techniques described herein may be implemented by any device with a display, such as the wearable device 102 (e.g., a smart bracelet, a smart ring, or smart glasses), a mobile phone, a notebook computer, a camera, a tablet computer, a personal media player, a personal navigating device (e.g., global positioning system), a gaming console, a desktop computer, a video camera, or a portable gaming device.

In the exemplary smartwatch 600, the display 602 is circular and can display information such as the current time, notifications, images, and the like. In some embodiments, the display 602 shows an analog watchface that tells the current time using one or more rotating pointers or hands that point to numbers arranged on a stationary dial. In other embodiments, the watchface uses rotating hour and minute dials and a stationary viewfinder that highlights the current time on the rotating dials. In some embodiments, the display 602 also hosts the user interface 116 via which the smartwatch 600 can be configured and controlled. Note that in other embodiments, the display 602 may be of another shape, such as square, rectangular, triangular, and the like.

The wristband 604 holds the smartwatch 600 on a user's wrist. The wristband 604 may be of leather, metal, or another suitable material and may include a clasp to secure it. In some embodiments that use a metal wristband 604, an insulating piece (e.g., a plastic link) separates the metal wristband 604 from the front housing 702 (see FIG. 7) to prevent grounding of the antenna.

Figure 7:
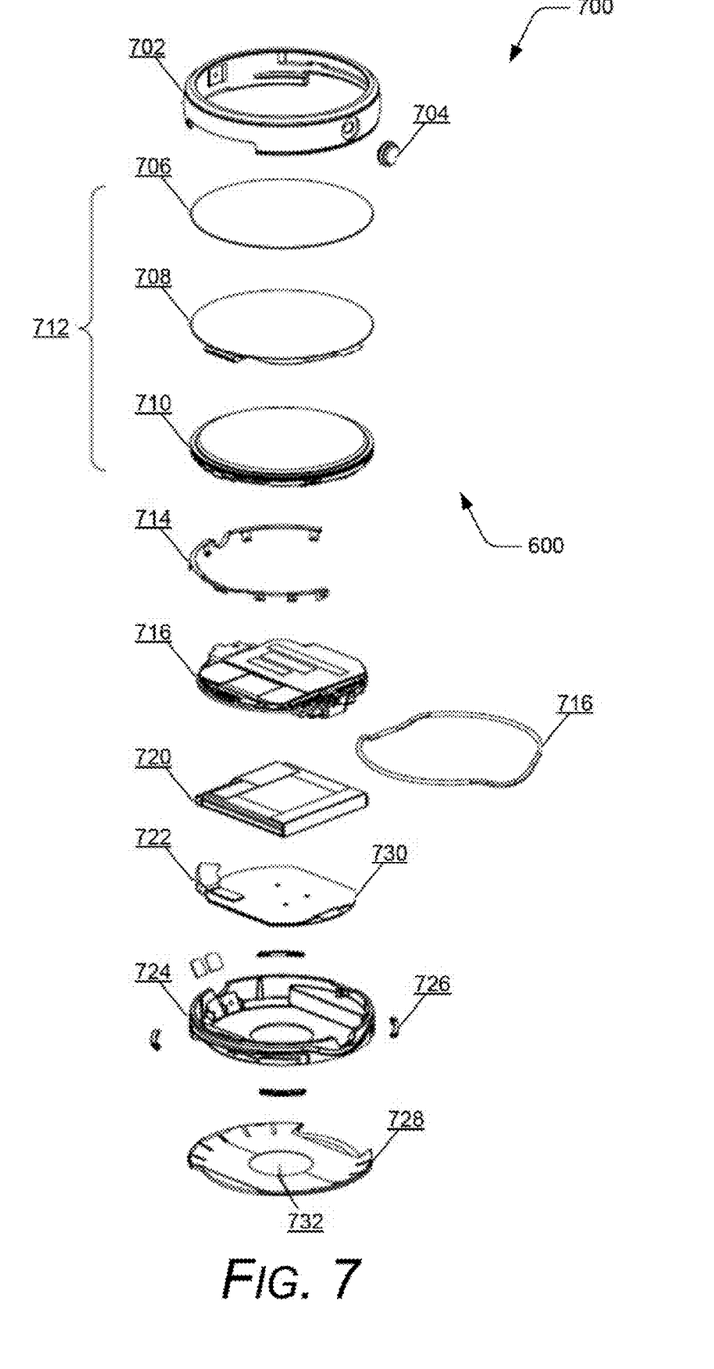
FIG. 7 illustrates an exploded view of various components of the example smartwatch shown in FIG. 6.

FIG. 7 illustrates an exploded view 700 of various components of the example smartwatch 600 shown in FIG. 6. In some embodiments, the smartwatch incorporates these components in a "stack" as shown. In other embodiments, however, some of these components may be placed in other locations, some of the components may be combined into a unitary component, and some embodiments add other components not shown to accomplish specific tasks.

Starting at the top of the component stack, a front housing 702 provides a cavity that surrounds most of the other components. This front housing 702 may be made of any suitable material. In some embodiments, the front housing is merely cosmetic, and the structural integrity of the smartwatch 600 is provided by other components. In some embodiments, the front housing 702 is metal and forms (along with a grounding ring 714 and a printed-circuit board 716 described below) an antenna (not separately shown). The function of the antenna is described below with reference to FIG. 10. In some embodiments, a power button 704 is supported by the front housing 702 and is used to turn the smartwatch 600 on and off.

The next three major components in the stack (a lens 706, a touch sensor 708, and a display 710) are discussed together as a lens assembly 712. The lens 706 itself is generally formed of glass or sapphire, is transparent, and protects the components below it. Next in the lens assembly 712 is the (at least partially transparent) touch sensor 708, such as a capacitive touch sensor. When so equipped, the lens assembly 712 becomes a touch-screen interface, whereby a user can touch the lens 706 and control the operation of the smartwatch 600. Although not shown, infrared or other sensors can be utilized to provide additional user-interface functionality. Finally, the display 710 presents visual information to the user. The display 710 may be a liquid-crystal display or may use other flat-panel display technologies. While the lens 706, touch sensor 708, and display 710 are the major components of the lens assembly 712, in some embodiments, other layers can be included. For example, in one embodiment, the lens assembly 712 includes a glass lens 706 at the top, then a layer of optically clear adhesive, then a polycarbonate lens with some artwork (e.g., a trademark, decoration, or alignment marks used during manufacture of the lens assembly 712), then another layer of adhesive, then a clear polycarbonate lens, then the touch sensor 708, then the display 710, and then a supporting bezel.

During operation, the lens assembly 712 includes an active area and a border region. The active area includes pixels that are used to display content to the user, and the border region provides structure for the lens assembly. In some embodiments, the width of the border region is less than five percent (5%) of the total diameter of the lens assembly 712. For example, the total diameter of the lens assembly may range from forty (40) to fifty (50) millimeters, while the border region is only one (1) to two (2) millimeters wide.

Next in the component stack is the grounding ring 714. In embodiments that include a slot antenna, the grounding ring 714 both drives and tunes the antenna. The grounding ring 714 is attached to the printed-circuit board 716. As is typical with consumer electronic devices, the printed-circuit board 716 provides most of the "intelligent" functionality of the device 600. The component stack also includes a water seal 718, which is an elastomeric ring. When the smartwatch 600 is fully assembled, the water seal 718 presses against other components to keep out water.

The electronics of the smartwatch 600 are powered by the battery 720. Generally, the shape of the battery is determined by packaging constraints, the goal being to get the most capable battery in the space allotted. Some embodiments include additional power sources, such as a pendulum that that charges the battery when the user moves the smartwatch 600. Such a pendulum may share some structural elements with a rotating vibrator 802 (see FIG. 8) used to provide haptic information to the user (e.g., as in the well-known silent ring used in cell phones). When placed in a charging system (not shown), a charging coil 722 receives electromagnetic energy and recharges the battery 720.

The rear housing 724 may be made of any suitable material, with ceramic preferred in some embodiments. Generally, the wristband 604 (see FIG. 6) attaches to the rear housing 724 with wristband-attachment pins (not shown) or via another mechanism. The housing-attachment pins 726 illustrated are one possible mechanism for connecting the rear housing 724 to the front housing 702. In some embodiments, a separate endplate 728 covers the rear housing 724. In some embodiments, the smartwatch 600 includes one or more sensors on its rear face (the face touching the user's wrist). The example component stack shows a "PPG" (PhotoPlethysmoGraphic) sensor 730 for reading the user's blood pressure. The PPG lens 732 allows the PPG sensor 730 to "look" through the rear housing 724 and the endplate 728. Other sensors may also be utilized to receive sensor data, such as sensor data corresponding to movement. The sensors can include an accelerometer configured to receive accelerometer data, a global positioning system ("GPS") sensor configured to receive GPS data, or any other type of sensor configured to sense movement.

Figure 8:
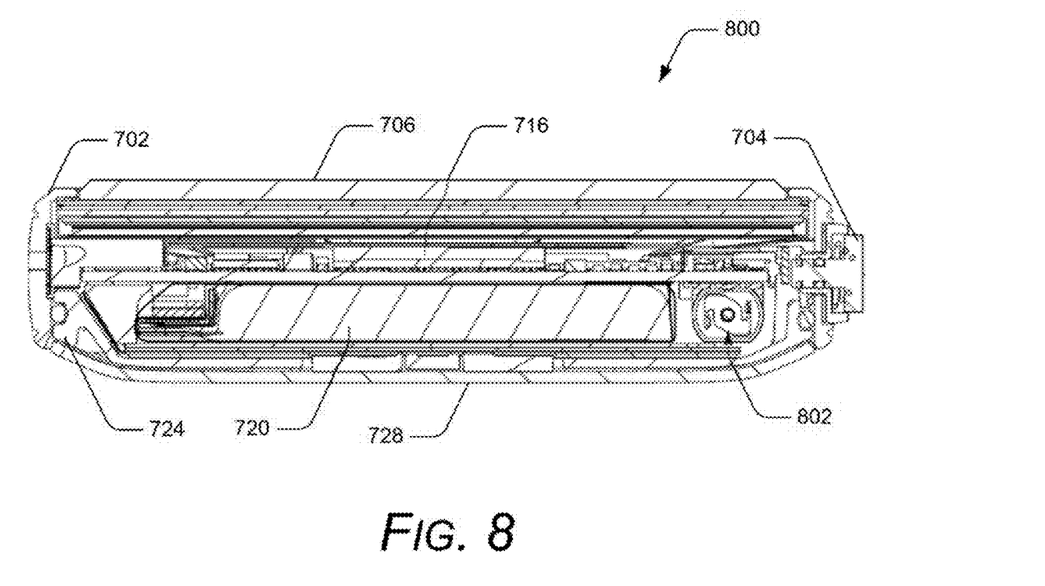
FIGS. 8 and 9 illustrate cross-sectional views through the example smartwatch shown in FIG. 6.
Figure 9:
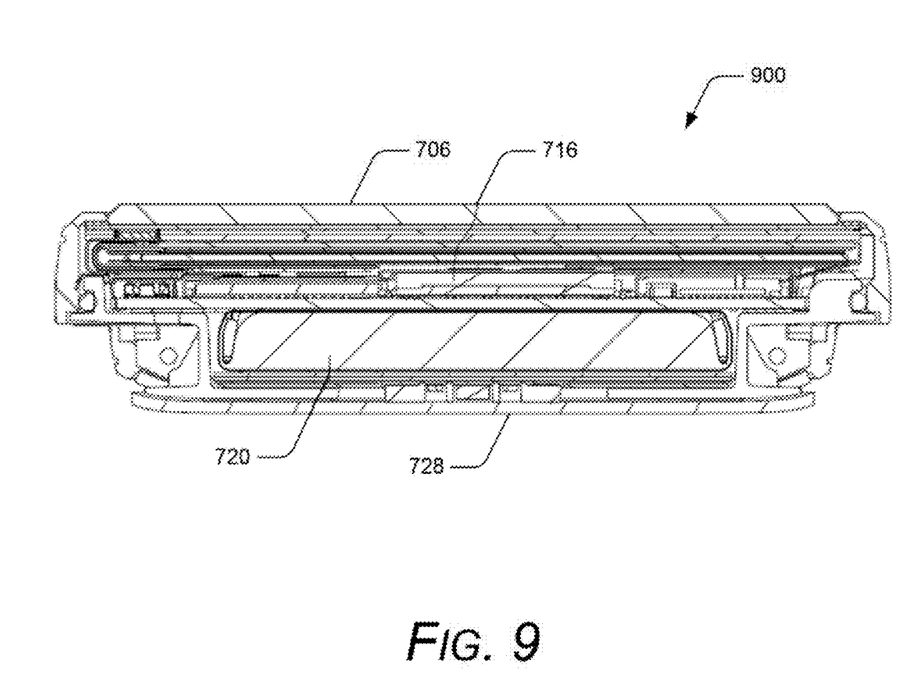

FIG. 8 illustrates a cross-sectional view 800 through the example smartwatch shown in FIG. 6. FIG. 9 illustrates another cross-sectional view 900 through the example smartwatch shown in FIG. 6. The FIGS. 8 and 9 show how the components of the exemplary stack described with reference to FIG. 7 fit together in some embodiments. For clarity's sake, only a few of the components of FIG. 7 are called out in the FIGS. 8 and 9.

Figure 10:
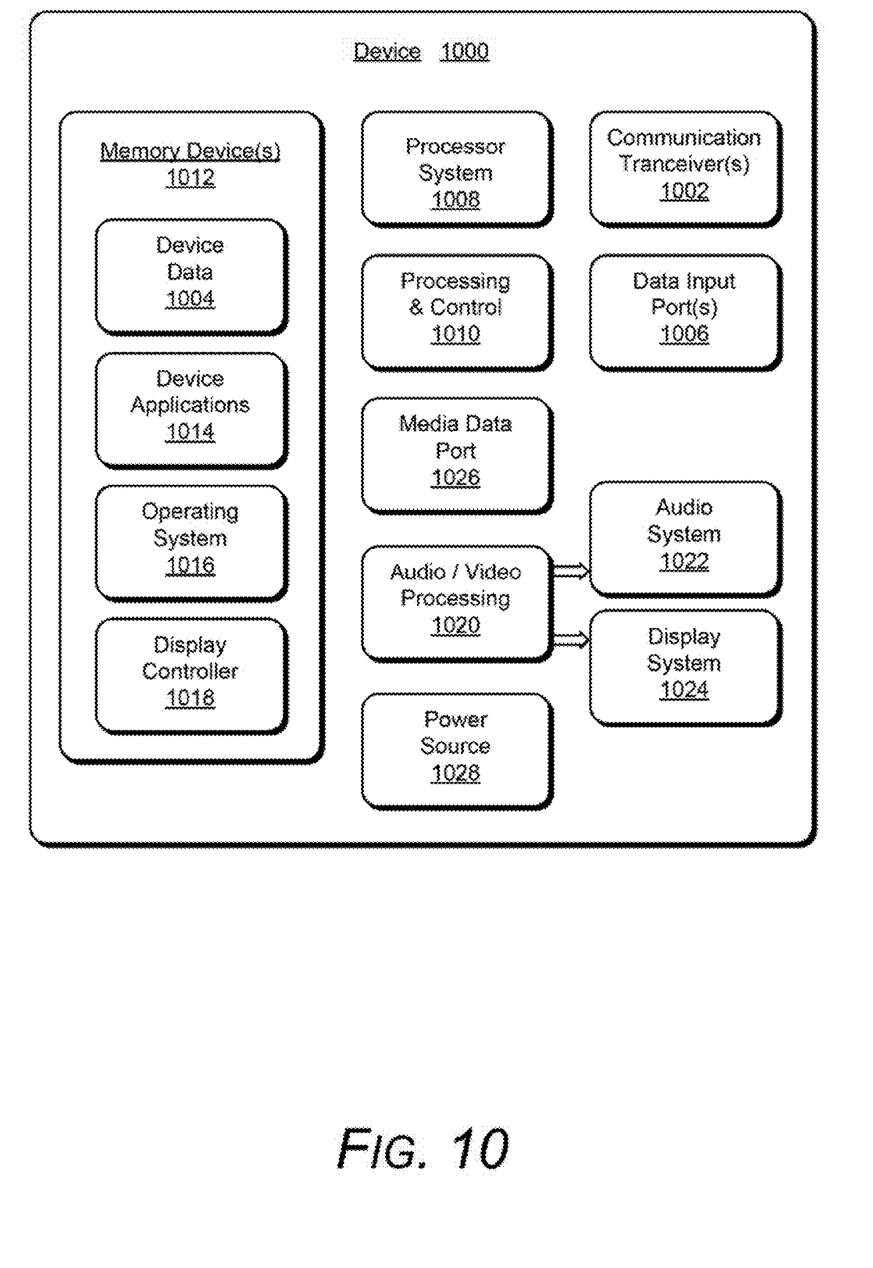
FIG. 10 illustrates various components of an example electronic device that can implement the techniques of an embedded light sensing component.

FIG. 10 illustrates various components of an example device 1000 that can be implemented as any wearable device and/or portable electronic device described with reference to any of the previous FIGS. 1-9. In embodiments, the example device 1000 may be implemented as any one or combination of a communication, computer, playback, gaming, entertainment, mobile phone, tablet computing device and/or wearable device.

The device 1000 includes communication transceivers 1002 that enable wireless transmission and reception of device data 1002. The transceivers 1000 can include radios compliant with various wireless personal-area-network standards, such as Institute of Electrical and Electronics Engineers ("IEEE") 802.15 standards, Infrared Data Association standards, or wireless Universal Serial Bus standards, to name just a few. The transceivers 1000 can also include wireless local-area-network radios compliant with any of the various IEEE 802.11 standards, wireless-wide-area-network radios for cellular telephony, and wireless-metropolitan-area-network radios compliant with various IEEE 802.15 standards. The transceivers connect to one or more antennas, such as, in some embodiments, a slot antenna formed from the front housing 702, the grounding ring 714, and the printed-circuit board 716 of FIG. 7.

Through these communication transceivers 1000, the smartwatch 600 communicates with other computing devices associated with a user of the smartwatch. For example, the user's smartphone may receive a text message over a wireless network, and the text message is then transmitted to the smartwatch 600. Upon receipt of the text message, the smartwatch can generate a notification regarding the text message, and the notification is displayed for the user on the display component.

The device 1000 may also include one or more data input ports 1006 via which any type of data, media content, and/or inputs can be received, such as user-selectable inputs, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to components, peripherals, or accessories such as microphones and/or cameras.

The device 1000 includes a processor system 1008 of one or more processors (e.g., any of microprocessors, controllers, and the like) and/or a processor and memory system (e.g., implemented in an SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 1000 also includes one or more memory devices 1012 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The device 1000 may also include a mass storage media device.

A memory device 1012 provides data storage mechanisms to store the device data 1004, other types of information and/or data, and various device applications 1014 (e.g., software applications). For example, an operating system 1016 can be maintained as software instructions with a memory device and executed by the processor system 1008. The device applications may also include a device manager, such as any form of a control application, software application, signal-processing and control module, code that is native to a particular device, a hardware abstraction layer for a particular device, and so on. The device may also include a display controller 1018 that controls a display component of the device, such as when the device 1000 is implemented as a wearable device as described with reference to FIGS. 1-9.

The device 1000 also includes an audio and/or video processing system 1020 that generates audio data for an audio system 1022 and/or generates display data for a display system 1024. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1026. In implementations, the audio system and/or the display system are integrated components of the example device.

The device 1000 can also include a power source 1028, such as when the device is implemented as a wearable device (e.g., a smartwatch device). The power source may include a charging and/or power system, and can be implemented as a flexible strip battery, a rechargeable battery, a charged supercapacitor, and/or any other type of active or passive power source.

Although embodiments of an embedded light sensing component have been described in language specific to features and/or methods, the subject of the appended claims is not necessarily limited to the specific features or methods described. Rather, the specific features and methods are disclosed as example implementations of an embedded light sensing component.

The invention claimed is:

1. A lens assembly, comprising:
a display component configured to display a user interface;
a lens structure configured to cover the display component;
a touch sensor layered between the display component and the lens structure, the touch sensor having a cutout; and
a light sensor configured to sense ambient light in an environment proximate the lens structure, the light sensor positioned between the display component and the lens structure and embedded through the cutout.

2. The lens assembly as recited in claim 1, wherein the light sensor is positioned in a laminate stack between the display component and the lens structure.

3. The lens assembly as recited in claim 1, wherein the lens structure is a two-part poly carbonate lens structure.

4. The lens assembly as recited in claim 3, wherein a first poly carbonate lens is configured for printed graphics that are protected between the first poly carbonate lens and a second poly carbonate lens of the two-part poly carbonate lens structure.

5. The lens assembly as recited in claim 1, wherein the lens structure has a second cutout and wherein the light sensor is embedded through the second cutout.

6. The lens assembly as recited in claim 1, wherein the touch sensor comprises X and Y bonding pads configured in four split sections, two of the split sections layered above the light sensor in the lens assembly as first X and Y bonding pads, and another two of the split sections layered below the light sensor in the lens assembly as second X and Y bonding pads.

7. The lens assembly as recited in claim 1, wherein the display component comprises an adjustable display brightness based on the ambient light that is sensed by the light sensor in the environment proximate the lens structure, the adjustable display brightness effective to conserve display component power.

8. The lens assembly as recited in claim 1, further comprising a glass lens configured to cover the lens assembly and through which the light sensor is configured to sense the ambient light in the environment proximate the lens structure.

9. A method, comprising:
displaying a user interface on a display component of a wearable device;
sensing touch inputs with a touch sensor that is layered over the display component; and
sensing ambient light in an environment proximate a lens structure that covers the touch sensor and the display component, the ambient light sensed with a light sensor that is embedded between the display component and the lens structure,
wherein the touch sensor is configured with a cutout through which the light sensor is said embedded.

10. The method as recited in claim 9, wherein:
the lens structure is a two-part poly carbonate lens structure.

11. The method as recited in claim 9, wherein the lens structure is configured with a second cutout through which the light sensor is said embedded.

12. The method as recited in claim 9, further comprising:
adjusting a display brightness of the display component based on the ambient light that is sensed by the light sensor in the environment proximate the lens structure, the adjustable display brightness effective to conserve display component power.

13. A wearable device, comprising:
a display component configured to display a user interface;
a lens structure configured to cover the display component;
a touch sensor configured to sense touch inputs to the user interface, the touch sensor having a cutout and layered between the display component and the lens structure; and
a light sensor configured to sense ambient light in an environment proximate the lens structure, the light sensor positioned between the display component and the lens structure and embedded through the cutout.

14. The wearable device as recited in claim 13, wherein:
the lens structure is a two-part lens structure.

15. The wearable device as recited in claim 14, wherein:
the two-part lens structure is a two-part poly carbonate lens structure; and
a first poly carbonate lens is configured for printed graphics that are protected between the first poly carbonate lens and a second poly carbonate lens of the two-part poly carbonate lens structure.

16. The wearable device as recited in claim 13, wherein lens structure has a second cutout and wherein the light sensor is embedded through the second cutout.

17. The wearable device as recited in claim 13, further comprising:
   a glass lens configured to cover the lens structure and through which the light sensor is configured to sense the ambient light in the environment proximate the lens structure.

18. The wearable device as recited in claim 13, wherein the touch sensor comprises X and Y bonding pads configured in four split sections, two of the split sections layered above the light sensor in the lens assembly as first X and Y bonding pads, and another two of the split sections layered below the light sensor in the lens assembly as second X and Y bonding pads.

* * * * *